United States Patent [19]

Vaida

[11] 4,124,940
[45] Nov. 14, 1978

[54] LEVEL AND METHOD OF ASSEMBLING SAME

[76] Inventor: Peter P. Vaida, 17 Fairview Ave., Clinton, N.J. 08809

[21] Appl. No.: 835,916

[22] Filed: Sep. 23, 1977

[51] Int. Cl.² ............................................. G01C 9/28
[52] U.S. Cl. ..................................................... 33/379
[58] Field of Search .................................. 33/379–383

[56] References Cited

U.S. PATENT DOCUMENTS

| | | | |
|---|---|---|---|
| 786,269 | 4/1905 | Currey | 33/381 |
| 2,502,905 | 4/1950 | Vaida et al. | 33/383 |
| 2,639,514 | 5/1953 | Garrison | 33/381 X |
| 2,810,206 | 10/1957 | Ziemann | 33/381 |
| 3,167,870 | 2/1965 | Strecter | 33/381 |
| 3,593,428 | 7/1971 | Jacoff | 33/379 |

*Primary Examiner*—Charles E. Phillips
*Attorney, Agent, or Firm*—Lerner, David, Littenberg & Samuel

[57] ABSTRACT

A method is provided for assembling a level of improved construction. The level comprises a frame, including a planar web section having a circular opening formed therein for receiving a level vial, with a pair of diametrically-opposed notches being formed in the periphery of the circular opening. First and second cover members are disposed on opposite sides of the planar web section to cover the opening, with one of the cover members including members for engaging the notches to prevent relative movement, and the other cover member including members for retaining a vial disposed within the opening. In addition, the first and second cover members include a mating connection for allowing relative movement between the cover members so that the position of the vial within the opening may be adjusted during assembly of the level. After assembly, the first and second cover members are ultrasonically bonded to each other through the opening to prevent movement of the cover members and vial relative to the frame after adjustment.

6 Claims, 6 Drawing Figures

LEVEL AND METHOD OF ASSEMBLING SAME

FIELD OF THE INVENTION

The present invention relates generally to levels, and specifically to an improved level including a vial-retaining member which is easily assembled and adjusted in order to properly position the vial relative to the working surface of the level.

BACKGROUND OF THE INVENTION

In recent years, many different types of levels have been developed and constructed. In one type of level, it is typical for the vial to be disposed within a circular opening formed in the web of a member having an I-beam-type cross section, with cover members being disposed on each side of the web to protect the vial. A common problem which exists in assembling such levels is to dispose the vial within the opening of the web so that the vial is accurately positioned relative to the working surface of the level. In one prior art arrangement, a pair of diametrically-opposed notches are formed in the periphery of the opening in order to position the vial without further adjustment. However, this method of construction is somewhat costly, since the diametrically-opposed notches must be precision formed with very little tolerance in order to ensure that the vial is accurately positioned and does not require adjustment. In addition, the cover members must be precision formed, as they include means for engaging the vial in order to properly position it relative to the plane of the web.

In another type of prior art arrangement, the vial is retained within one of the cover members, and then the cover members are connected by screws or the like to the web of the I-beam frame. However, as the cover member supporting the vial is connected to the web by screws, there is very little, if any, room for adjusting the position of the vial relative to the working surface of the level.

Accordingly, it has long been desired to provide a simple and inexpensive arrangement for accurately positioning a vial relative to the working surface of a level which does not require precision and expensive forming of parts and allows the vial to be quickly and easily adjusted within the level.

Broadly, it is an object of the present invention to provide an improved level which overcomes one or more of the aforesaid problems. Specifically, it is within the contemplation of the present invention to provide an improved level which allows quick and easy assembly of the level and vial, and which further allows the vial to be accurately positioned and adjusted in an efficient and simple manner without requiring relatively expensive, precision-formed parts.

SUMMARY OF THE INVENTION

Briefly, in accordance with the principles of the present invention, an improved level is provided which comprises a frame, including a planar web section having a circular opening formed therein for receiving a level vial, with a pair of diametrically-opposed notches being formed in the periphery of the circular opening. A first cover member is disposed on one side of the planar web section to cover the circular opening and includes extensions for engaging the notches to prevent movement between the first cover member and the frame. In addition, a second cover member is also disposed on the other side of the planar web section to cover the opening and includes members for retaining a vial in a fixed orientation relative to the second cover member and for disposing the vial within the circular opening. The first and second cover members are provided with a mating connection, such as a tongue and groove connection, through the circular opening, for allowing relative movement between the cover members so that the position of the vial within the circular opening may be adjusted during assembly of the level. After assembly and adjustment, the first and second cover members are then ultrasonically bonded to each other through the circular opening to prevent movement of the cover members and vial relative to the frame after adjustment.

In accordance with the principles of the present invention, an improved method is also provided for assembling and adjusting the above-described improved level.

Advantageously, as a result of the present invention, the level may be easily and quickly assembled and adjusted. More particularly, it is no longer necessary to precision form the notches of the web, since they are not being used to position the vial relative to the working surface of the level, but only function to hold the cover members from moving relative to the frame. In accordance with the present invention, the vial is easily placed in one of the cover members, and then that cover is merely adjusted relative to the frame. This also avoids the problem of the cover members being precision formed to support the vial, as in the prior art, and also avoids the need for accurately forming screw holes within the cover member and web to assemble the level.

BRIEF DESCRIPTION OF THE DRAWINGS

Further objects, features, and advantages of the present invention will become apparent upon the consideration of the following detailed description of a presently-preferred embodiment when taken in conjunction with the accompanying drawing, wherein.

DETAILED DISCUSSION OF PREFERRED EMBODIMENTS OF THE INVENTION

Figure 1:
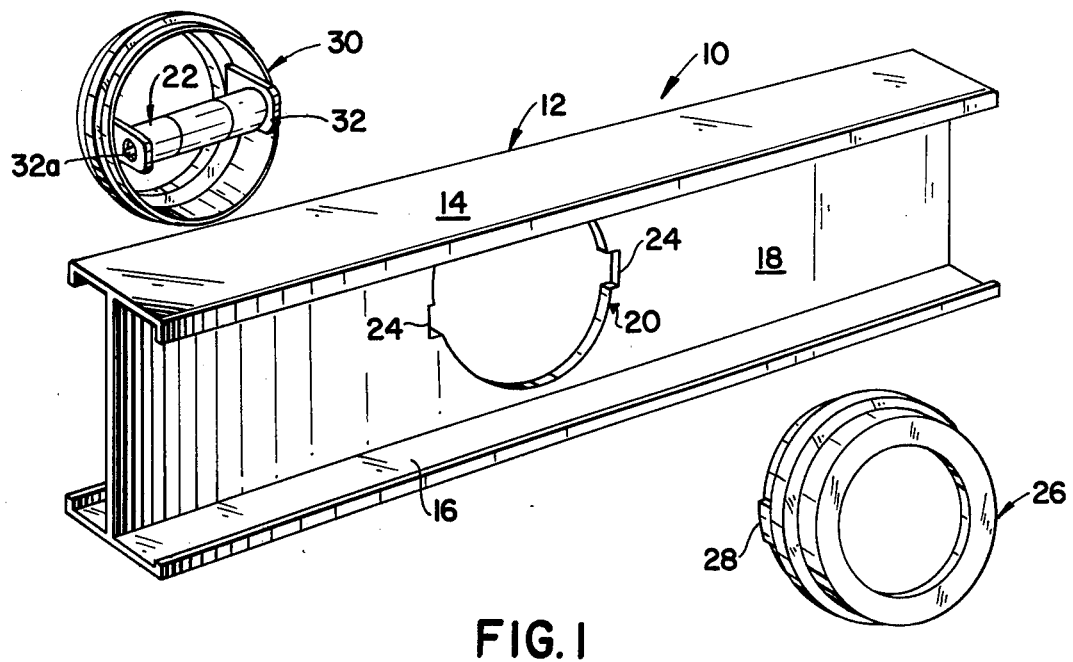
FIG. 1 is an exploded perspective view illustrating the construction and the method of assembling the level of the present invention.
Figure 2:
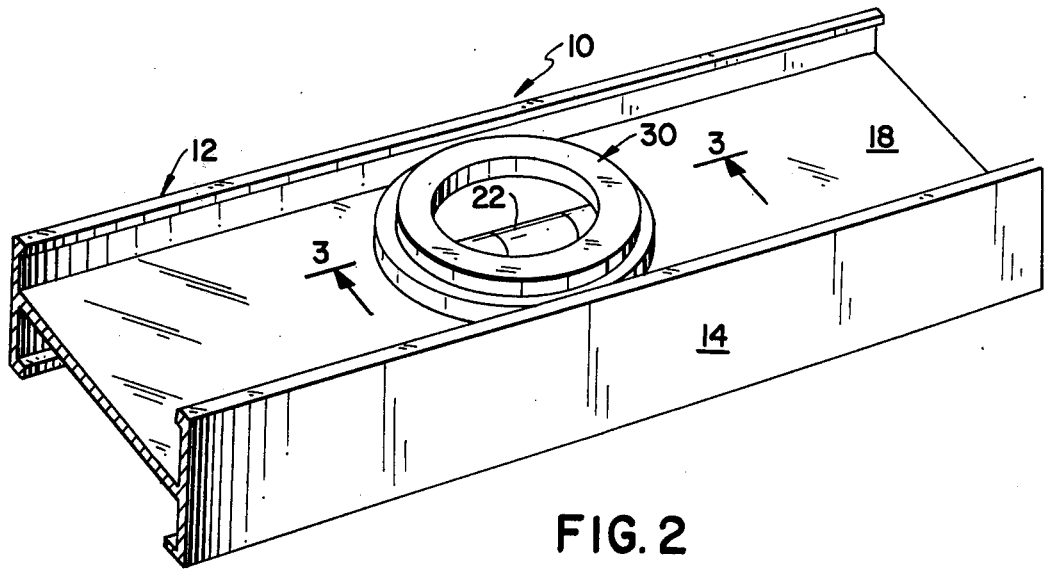
FIG. 2 is a perspective view of the level shown in FIG. 1 in its assembled configuration.

Referring now to FIG. 1, there is shown the improved level of the present invention, generally designated by the reference numeral 10, and includes a frame member 12 which, in cross-section, has an I-beam configuration. The frame member 12 includes upper and lower end sections 14, 16 which form the working surfaces of the level. In addition, frame member 12 includes a planar web section 18 connected at each end to the end sections 14, 16. Preferably, the frame member 12 is formed of aluminum but may be formed of any other sturdy and light-weight material.

The planar web section 18 is provided with a cutout or opening 20, which may be in the shape of a circle or a square and is formed therein for receiving a suitable level vial 22. As is well known in the art, the vial 22 may be formed of plastic or glass and is partially filled with a liquid to form a bubble therein which is used in establishing the level positions. A pair of diametrically-opposed notches 24 is formed in the periphery of circular opening 20, for a purpose to be explained.

There is provided a plastic, transparent cover member 26 which includes a pair of diametrically-opposed extension ears 28 for engaging respective notches 24. In this manner, cover member 26 is disposed on one side of the planar web section 18 to cover one side of the circular opening 20, and the engagement of extension ears 28 with notches 24 prevents movement between cover member 26 and frame member 12.

There is also provided a plastic, transparent cover member 30 which includes a pair of resilient plastic members 32, having openings 32a formed therein. In this manner, resilient members 32 may be forced apart to receive and support the vial 22 which is provided with nipple-type extensions for engaging respective openings 32a, so that vial 22 is retained in a fixed orientation relative to cover member 30. In assembling the level, cover member 30 is disposed on the other side of planar web section 18 to cover the other side of circular opening 20, so that vial 22 is disposed within circular opening 20.

Figure 3:
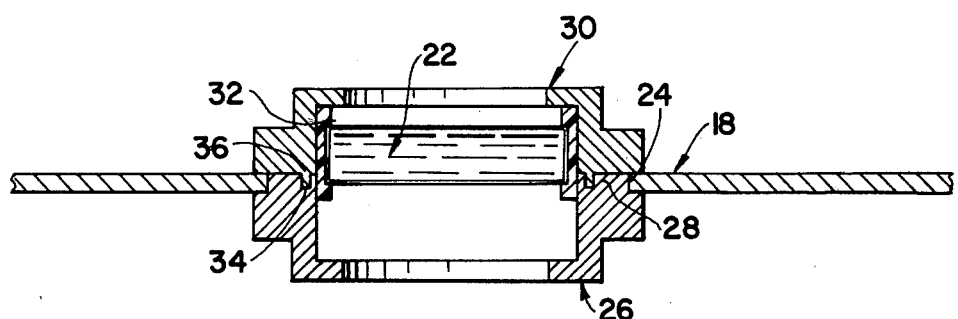
FIG. 3 is a cross-sectional view taken on the line 3—3 of FIG. 2 illustrating the mating connection between the first and second cover members through the opening of the web of the level.
Figure 4:
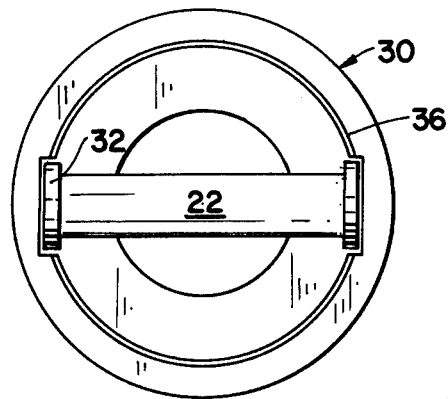
FIG. 4 is a top plan view of the cover member supporting the vial.
Figure 6:
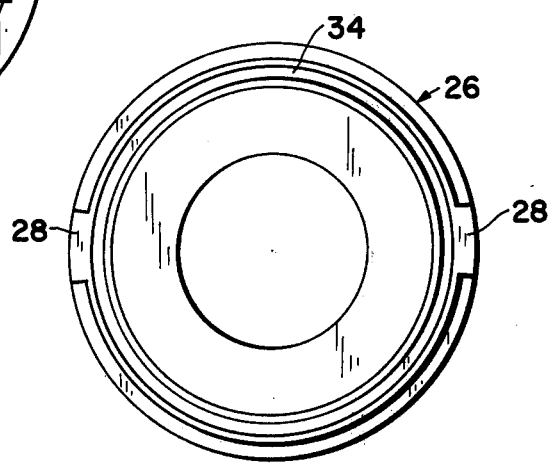
FIG. 6 is a top plan view of the cover member for engaging the other side of the level.

Referring now in particular to FIGS. 3, 4, and 6, it will be noted that cover members 26 and 30 are provided with means for engaging each other through circular opening 20. More particularly, cover member 26 is provided with a circular groove 34 formed in the bottom surface thereof and is adapted to matingly receive a circular extension or tongue 36 formed on the bottom surface of cover member 30. As will be understood, with the tongue and groove connection 34, 36 matingly connecting respective cover members 26, 30, relative movement is allowed between the cover members 26, 30. More particularly, cover member 30 supporting vial 22 may be rotated relative to cover member 26 and planar web section 18 in order to adjust and accurately position vial 22 within circular opening 20 during assembly of the level 10.

Once the position of cover 30 and vial 22 has been adjusted so that vial 22 has the desired orientation with respect to working surfaces 14, 16 of level 10, the assembly of level 10 may then be completed. To accomplish this, the plastic cover members 26, 30 are fastened to each other through circular opening 20 in any suitable manner. For example, the cover members may be fastened by adhesives, heat sealing, ultrasonic bonding, or screws. In this manner, relative movement between cover members 26, 30 is prevented. In addition, as cover member 26 is fixed in position relative to frame member 12, cover member 30 is prevented from moving relative to frame member 12. As a result, movement of vial 22 relative to frame member 12 is prevented after the position of vial 22 is adjusted.

Figure 5:
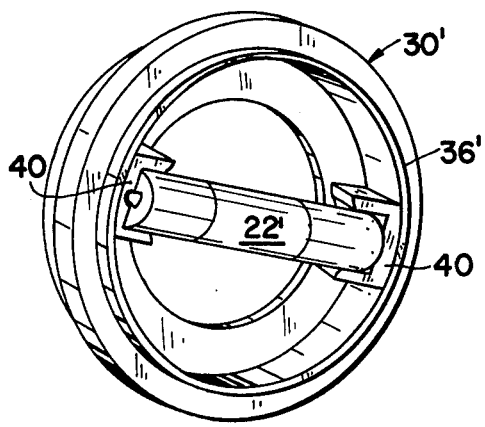
FIG. 5 is a perspective view of an alternative form of the cover member shown in FIG. 4 which includes a modified arrangement for supporting the vial relative to the cover.

Referring now to FIG. 5, there is shown an alternative arrangement for supporting and retaining vial 22' on cover member 30'. More particularly, cover member 30' is provided with receiving pockets 40 for receiving and supporting vial 22' in a fixed orientation relative to cover member 30' and for disposing vial 22' within the circular opening 20 of planar web section 18. Cover member 30' includes a circular tongue member 36' which is adapted to mate with groove 34 of cover 26 in the same manner that cover member 30 mated with cover member 26. Moreover, as the only difference between cover members 30 and 30' relates to the manner in which the vial is retained in the cover, the steps of assembling the level, as described above, are performed in the same manner.

In view of the foregoing, it will be appreciated that there has been provided, in accordance with the present invention, an improved level and an improved method of assembling a level. As a result of the present invention, precision forming of the notches of the planar web section is avoided, and in addition, precision forming of the cover members to support the vial is also avoided. In the present invention, it is only necessary to assemble the cover members and frame member, and then merely rotate the cover member supporting the vial to its desired angular orientation, and then to weld the two cover members together. As the frame member and cover members do not have to be precision formed, they are less costly. In addition, once the level of the present invention is assembled, it is only a simple matter to adjust same to ultrasonically weld the cover members.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A measuring tool comprising:
   a frame including a planar web section having an a circular opening formed therein for receiving a level vial,
   a first cover member disposed on one side of said planar web section to cover one side of said opening, said planar web section and said first cover member including cooperating means which cooperate to prevent rotary movement of said first cover member relative to said frame,
   a second cover member disposed on the other side of said planar web section to cover the other side of said opening, and including means for retaining a vial in a fixed orientation relative to said second cover member and for disposing said vial within said opening,
   a vial supported by said vial-retaining means and being disposed within said opening,
   means formed on said first and second cover members for matingly engaging each other through said opening so that during assembly, relative rotary movement is allowed between said first and second cover members to adjust the position of said vial within said opening, and
   said first and second cover members being adhered quickly to each other after the adjustment of the position of the vial with respect to said frame to prevent movement of said cover members and vial relative to said frame after adjustment.

2. A measuring tool in accordance with claim 1, wherein said means for engaging said first and second cover members is an interlocking connection which allows relative movement between the first and second cover members during assembly of said level.

3. A measuring tool in accordance with claim 1, wherein said vital-retaining means includes a pair of diametrically-opposed, resilient plastic members for receiving and supporting said vial.

4. A measuring tool in accordance with claim 1, wherein said vital-retaining means includes a pair of diametrically-opposed receptacles having indentations for receiving said vial and for maintaining said vial in a fixed orientation relative to said second cover member.

5. A measuring tool in accordance with claim 1, wherein said cooperating means includes a pair of diametrically-opposed notches formed in the periphery of said opening, and extension members formed on said first cover member for engaging said notches to prevent movement of said first cover member relative to said frame.

6. A measuring tool in accordance with claim 1, wherein said adhering of said first and second cover members is an ultrasonic weld.

* * * * *

UNITED STATES PATENT AND TRADEMARK OFFICE
CERTIFICATE OF CORRECTION

PATENT NO. : 4,124,940
DATED : November 14, 1978
INVENTOR(S) : Peter P. Vaida

It is certified that error appears in the above-identified patent and that said Letters Patent are hereby corrected as shown below:

IN THE CLAIMS, Column 4, line 62, the word "quickly" should read -- directly --.

Signed and Sealed this

Eighth Day of May 1979

[SEAL]

Attest:

RUTH C. MASON
Attesting Officer

DONALD W. BANNER
Commissioner of Patents and Trademarks